United States Patent [19]
Ozaki

[11] Patent Number: 5,365,347
[45] Date of Patent: Nov. 15, 1994

[54] CODING APPARATUS

[75] Inventor: Tohru Ozaki, Tokyo, Japan

[73] Assignee: Matsushita Graphic Communication Systems, Inc., Tokyo, Japan

[21] Appl. No.: 824,125

[22] Filed: Jan. 22, 1992

[30] Foreign Application Priority Data

Jan. 31, 1991 [JP] Japan .................. 3-010735

[51] Int. Cl.5 .............................. H04N 1/41
[52] U.S. Cl. ................. 358/261.1; 358/261.3
[58] Field of Search ............ 358/426, 261.1, 261.2, 358/261.3, 261.4, 432

[56] References Cited

U.S. PATENT DOCUMENTS

| | | | |
|---|---|---|---|
| 4,571,633 | 2/1986 | Kondo . | |
| 4,654,719 | 3/1987 | Tomita | 358/261 |
| 4,799,110 | 1/1989 | Hisada et al. | 358/261.3 |
| 4,937,681 | 6/1990 | Fujinawa et al. | 358/426 |

FOREIGN PATENT DOCUMENTS

| | | |
|---|---|---|
| 58-88971 | 5/1983 | Japan . |
| 59-11063 | 1/1984 | Japan . |
| 59-58971 | 4/1984 | Japan . |
| 61-212967 | 9/1986 | Japan . |
| 61-232776 | 10/1986 | Japan . |

*Primary Examiner*—Bentsu Ro
*Attorney, Agent, or Firm*—Lowe, Price, LeBlanc & Becker

[57] ABSTRACT

In a coding apparatus, a first detecting device serves to detect a variation between conditions of pixels in a currently-coded line. A second detecting device serves to detect a variation between conditions of pixels in a reference line which immediately precedes the currently-coded line. A deciding device serves to decide a mode of MR coding in accordance with the variations detected by the first and second detecting devices. The first and second detecting devices and the deciding device are enabled to execute functions thereof in temporally parallel with each other.

3 Claims, 5 Drawing Sheets

CODING APPARATUS

BACKGROUND OF THE INVENTION

1. Field of the Invention

This invention relates to a coding apparatus usable in various systems such as facsimile machines.

2. Description of the Prior Art

In general, MR-type (Modified Read type) coding apparatus in facsimile machines determine or select one of different coding modes by using a correlation between conditions of variations in pixels in a reference line and conditions of variations in pixels in a coded line. The reference line immediately precedes the coded line.

In a prior art coding apparatus of such a type, with respect to each of reference lines and coded lines, a detection is given of a point at which an image signal changes from a white pixel level to a black pixel level or from a black pixel level to a white pixel level. Widen such a change point is detected, a coding mode is determined in accordance with the conditions of the change point. The time portion of the image signed which lasts until the moment of the occurrence of the change point is coded according to the determined coding mode. Then, the process of detecting a next change point is restarted for determining a next coding mode. Such a prior art design is disclosed in various documents, for example, Japanese published unexamined patent applications 58-88971, 61-212967, and 61-232776.

The above-mentioned prior art design has a problem in the speed of coding which is caused for the following reason. In the prior art design, when one of the process of detecting a change point in an image signal and the process of determining a coding mode is completed, the other is started. Specifically, while the process of detecting a change point is continued, the process of determining a coding mode remains suspended. In addition, while the process of determining a coding mode is continued, the process of detecting a change point remains suspended. Thus, in the prior art design, the process of detecting a change point and the process of determining a coding mode are executed alternately, so that the coding process tends to be interrupted at a higher frequency and therefore the speed of the coding process tends to be low.

SUMMARY OF THE INVENTION

It is an object of this invention to provide an improved coding apparatus.

A first aspect of this invention provides a coding apparatus comprising first detecting means for detecting a variation between conditions of pixels in a currently-coded line: second detecting means for detecting a variation between conditions of pixels in a reference line which immediately precedes the currently-coded line; deciding means for deciding a mode of MR coding in accordance with the variations detected by the first and second detecting means; and means for enabling the first and second detecting means and the deciding means to execute functions thereof in temporally parallel with each other.

A second aspect of this invention provides a coding apparatus comprising first detecting means for sequentially detecting change pixels in a currently-coded line independent of a start pixel, and deriving information of tile detected change pixels in the currently-coded line; second detecting means for sequentially detecting change pixels in a reference line independent of the start pixel, and deriving information of the detected change pixels in the reference line, the reference line immediately preceding the currently-coded line; selecting means for selecting one of the information derived by the first detecting means and the information derived by the second detecting means; generating means for generating information of the start pixel from the information selected by the selecting means; and deciding means for deciding a mode of MR coding in accordance with the information derived by the first detecting means, the information derived by the second detecting means, and the information generated by the generating means.

A third aspect of this invention provides a coding apparatus comprising first detecting means for sequentially detecting change pixels in a currently-coded line independent of a start pixel, and deriving information of the detected change pixels in the currently-coded line; second detecting means for sequentially detecting change pixels in a reference line independent of the start pixel, and deriving information of the detected change pixels in the reference line, the reference line immediately preceding the currently-coded line; selecting means for selecting one of the information derived by the first detecting means and the information derived by the second detecting means; generating means for generating information of the start pixel from the information selected by the selecting means; comparing means for comparing the information generated by the generating means and the information derived by the second detecting means selectively disabling and enabling the information derived by the second detecting means, and outputting only the enabled information derived by the second detecting means; and deciding means for deciding a mode of MR coding in accordance with the information derived by the first detecting means, the information outputted from the comparing means, and the information generated by the generating means.

A fourth aspect of this invention provides a coding apparatus comprising first detecting means for sequentially scanning pixels in a currently-coded line, sequentially detecting change pixels in the currently-coded line independent of a start pixel, and deriving information of the detected change pixels in the currently-coded line; first generating means for generating information representing a position of a pixel currently scanned by the first detecting means; second detecting means the sequentially scanning pixels in a reference information of the detected change pixels in the reference line independent of the start pixel, and deriving information of the detected change pixels In the reference line, the reference line immediately preceding the currently-coded line; second generating means for generating information representing a position of a pixel currently scanned by the second detecting means; and deciding means for deciding a mode of MR coding in accordance with the information derived by the first detecting means, the information generated by the first generating means, the information derived by the second detecting means, and the information generated by the second generating means.

A fifth aspect of this invention provides a coding apparatus comprising first detecting means for sequentially scanning pixels in a currently-coded line, sequentially detecting change pixels in the currently-coded line independent of a start pixel, and deriving information of the detected change pixels in the currently-coded line; first generating means for generating information representing a position of a pixel currently scanned by the first detecting means; first selecting means for selecting one of the information derived by the first detecting means and the information generated by the first generating means; second detecting means for sequentially scanning pixels in a reference line, sequentially detecting change pixels in the reference line independent of the start pixel, and deriving information of the detected change pixels in the reference line, the reference line immediately preceding the currently-coded line; second generating means for generating information representing a position of a pixel currently scanned by the second detecting means; second selecting means for selecting one of the information derived by the second detecting means and the information generated by the second generating means; and deciding means for deciding a mode of MR coding in accordance with the information selected by the first selecting means, and the information selected by the second selecting means.

DESCRIPTION OF THE FIRST PREFERRED EMBODIMENT

A change pixel is now defined as a pixel having a state which differs from the state of the immediately-preceding pixel. MR coding is done according to the relative positions of change pixels on a currently-coded line and reference pixels on the coded line or a reference line immediately preceding the coded line. The change pixels and the reference pixels are prescribed as follows.

a0: The start pixel on a coded line;

a1: The first change pixel on the coded line which exists rightward of the start pixel a0;

a2: The first change pixel on the coded line which exists rightward of the change pixel a1;

b1: The first change pixel on a reference line which exists rightward of the start pixel a0 and which has a color opposite to the color of the start pixel a0;

b2: The first change pixel on the reference line which exists rightward of the reference pixel b1.

The characters a0, a1, a2, b1, and b2 represent numbers corresponding to addresses or positions of the related pixels. In general, the address of the left-had end pixel in a line is defined as being equal to a given minimum number, and the address is incremented one by one as the pixel is closer to the right-hand end of the line.

MR coding is classified into the following three modes according to the relation among the previously-mentioned change points, and the start pixel is updated in accordance with the selected mode.

(1) Pass Mode:

$a1 > b2$, and the start pixel a0 is updated to the change pixel b2.

(2) Vertical Mode:

$a1 \leq b2$ and $|a1-b1| \leq 3$, and the start pixel a0 is updated to the change pixel a1.

(3) Horizontal Mode:

$a1 \leq b2$ and $|a1-b1| > 3$, and the start pixel a0 is updated to the change pixel a2.

Figure 1:
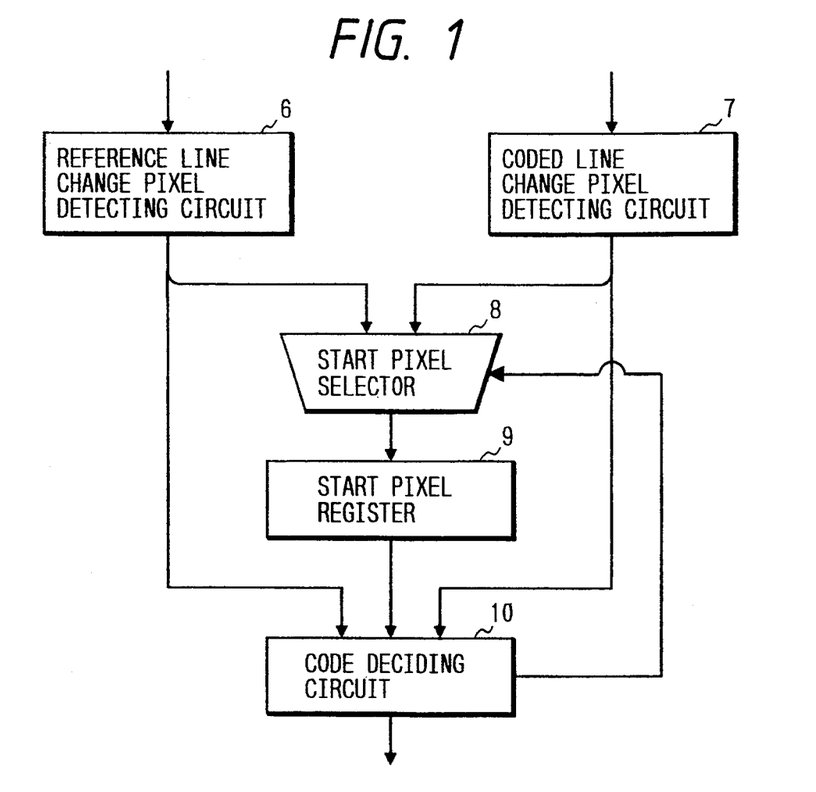
FIG. 1 is a block diagram of a coding apparatus according to a first embodiment of this invention.

With reference to FIG. 1, a coding apparatus includes change pixel detecting circuits 6 and 7, a start pixel selector 8, a start pixel register 9, and a code deciding circuit 10. The change pixel detecting circuit 6 receives an image signal representing a reference line. The change pixel detecting circuit 6 serves to detect change pixels on the reference line. The change pixel detecting circuit 7 receives an image signal representing a coded line. The change pixel detecting circuit 7 serves to detect change pixels on the coded line. The start pixel selector 8 serves to select start pixel information for determining a next coding mode. The start pixel register 9 temporarily stores the start pixel information, and outputs the start pixel information to the code deciding circuit 10. The code deciding circuit 10 determines the mode of MR coding, and executes coding in dependence upon the determined coding mode.

Since the reference line immediately precedes the coded line (the currently-coded line), the reference-line image signal applied to the change pixel detecting circuit 6 has a 1-line time difference from the coded-line image signal applied to the change pixel detecting circuit 7. An input image signal is directly applied to one of the circuits 6 and 7, and is applied to the other via a suitable time adjustment device (not shown) such as a 1-line delay circuit.

The coding apparatus of FIG. 1 operates as follows. When the change pixel detecting circuit 6 detects a change pixel on a reference line, the change pixel detecting circuit 6 generates reference-line change pixel information in response to the detected change pixel and outputs the reference-line change pixel information to the start pixel selector 8 and the code deciding circuit 10.

Figure 2:
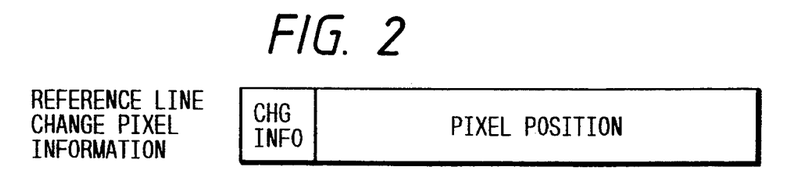
FIG. 2 is a diagram showing the format of reference-line change pixel information.

As shown in FIG. 2, the reference-line change pixel information has a change information bit which represents whether the related change agrees with a change from a black pixel to a white pixel or from a white pixel to a black pixel. Specifically, the change information bit being "0" represents that the related change agrees with a change from a black pixel to a white pixel. The change information bit being "1" represents that the related change agrees with a change from a white pixel to a black pixel. As shown in FIG. 2, the reference-line change pixel information also has a given number of bits which follow the change information bit and which represent the position (the address) of the detected change pixel.

When the change pixel detecting circuit 7 detects a change pixel on a coded line, the change pixel detecting circuit 7 generates coded-line change pixel information in response to the detected change pixel and outputs the coded-line change pixel information to the start pixel selector 8 and the code deciding circuit 10.

Figure 3:
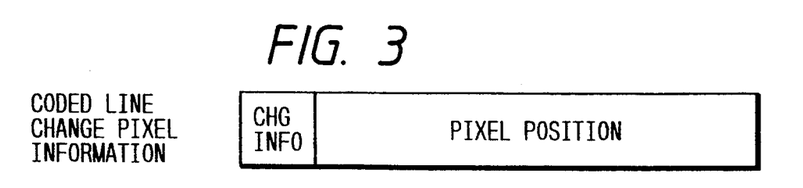
FIG. 3 is a diagram showing the format of coded-line change pixel information.

As shown in FIG. 3, the coded-line change pixel information has a change information bit which represents whether the related change agrees with a change from a black pixel to a white pixel or from a white pixel to a black pixel. Specifically, the change information bit being "0" represents that the related change agrees with a change from a black pixel to a white pixel. The change information bit being "1" represents that the related change agrees with a change from a white pixel to a black pixel. As shown in FIG. 3, the coded-line change pixel information also has a given number of bits which follow the change information bit and which represent the position (the address) of the detected change pixel.

The code deciding circuit 10 determines a coding mode, and specifically selects one of the previously-mentioned three coding modes (the pass mode, the vertical mode, and the horizontal mode), in response to the reference-line change pixel information, the coded-line change pixel information, and the start pixel information. The code deciding circuit 10 executes the coding of the image signal in accordance with the determined coding mode. In addition, the code deciding circuit 10 generates a selector control signal in accordance with the determined coding mode, and outputs the generated control signal to the start pixel selector 8.

The start pixel selector 8 selects one of the output signals from the change pixel detecting circuits 6 and 7, that is, the reference-line change pixel information and the coded-line change pixel information, as start pixel information in response to the control signal. The change information in the selected change pixel information is used as color information of the start pixel information, and the pixel position information in the selected change pixel information is used as pixel position information of the start pixel information. The start pixel selector 8 outputs the start pixel information, and stores the start pixel information into the start pixel register 9. The stored start pixel information will be used in the determination of a subsequent coding mode.

Figure 4:
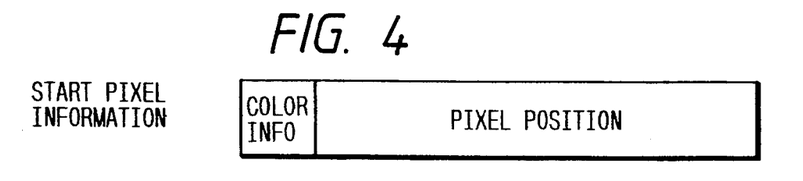
FIG. 4 is a diagram showing the format of start pixel information.

As shown in FIG. 4, the start pixel information has a color information bit which represents whether the related start pixel agrees with a black pixel or a white pixel. Specifically, the color information bit being "0" represents that the related start pixel agrees with a white pixel. The color information bit being "1" represents that the related start pixel agrees with a black pixel. As shown in FIG. 4, the start pixel information also has a given number of bits which follow the color information bit and which represent the position (the address) of the related start pixel.

The change pixel detecting circuits 6 and 7 execute processes of searching next change points in the reference line and the coded line simultaneously with or temporally parallel with the above-mentioned processes executed by the code deciding circuit 10, the start pixel selector 8, and the start pixel register 9. Thus, the detection of change pixels and the determination of a coding mode are executed simultaneously with or in temporally parallel with each other, so that a higher speed of the coding process is enabled.

The change pixel detecting circuits 6 and 7 have a known design. For example, a change point detector 300 in Japanese published examined patent application 1-49072 can be used as the change pixel detecting circuits 6 and 7.

Figure 5:
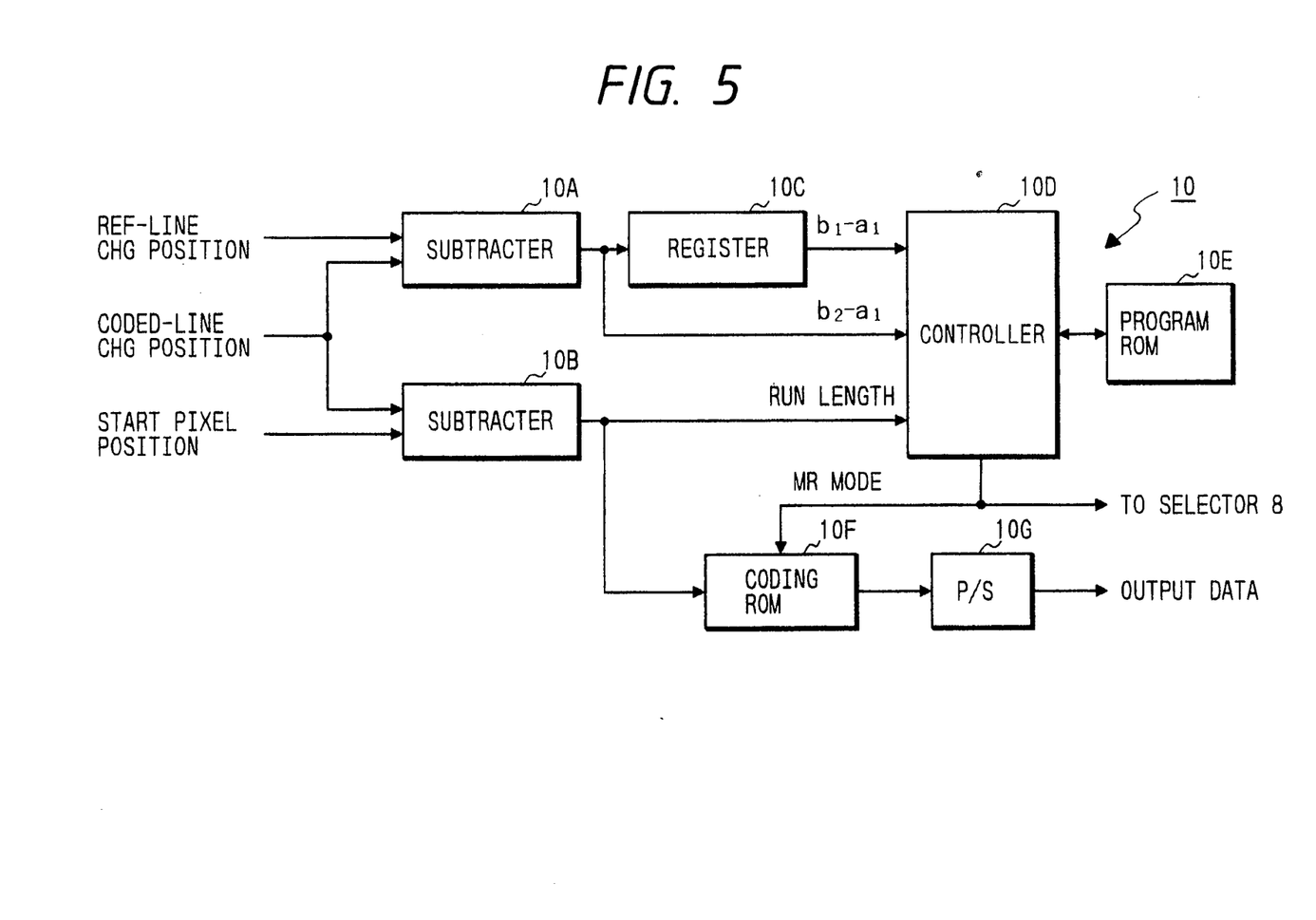
FIG. 5 is a block diagram of the code deciding circuit of FIG. 1.

As shown in FIG. 5, the code deciding circuit 10 includes subtracters 10A and 10B, a register 10C, a controller 10D, ROMs 10E and 10F, and a parallel-to-serial (P/S) converter 10G. The devices 10A, 10B, 10C, 10F, and 10G are controlled by the controller 10D in accordance with a control program stored in the ROM 10E. The controller 10D includes a processor, a microcomputer, or another similar device. The ROM 10F has a coding table for converting run length information to MR code information. The output code information from the coding ROM 10F is converted by the P/S converter 10G into corresponding serial code data.

The subtracter 10A receives a signal representing the position of a change pixel on a reference line, and a signal representing the position of a change pixel on a coded line. The subtracter 10A serves to calculate a difference between the position of a change pixel on a reference line and the position of a change pixel on a coded line. Specifically, the subtracter 10A calculates the value b1−a1 and also the value b2-a1. The subtracter 10B receives the signal representing the position of a change pixel on a coded line, and a signal representing the position of a start pixel. The subtracter 10B serves to calculate a difference between the position of a change pixel on a coded line and the position of a start pixel. Specifically, subtracter 10B calculates the run length a1-a0 and also the run length a2-a1. The register 10C functions to store the output signal from the subtracter 10A which represents the value b1-a1.

The controller 10D receives the output signal from the register 10C which represents the value b1-a1. In addition, the controller 10D receives the output signal from the subtracter 10A which represents the value b2-a1. Furthermore, the controller 10D receives the output signal from the subtracter 10B which represents the run length information. The controller 10D determines or selects one of the three MR coding modes in accordance with the value b1-a1, the value b2-a1, and the run length information, and generates and outputs a control signal (an MR coding mode signal) representing the selected MR coding mode. The MR coding mode signal is fed from the controller 10D to the coding ROM 10F and the selector 8 (see FIG. 1).

The coding ROM 10F receives the run length information from the subtracter 10B. The coding ROM 10F converts the run length information into MR code information in accordance with the MR coding mode signal fed from the controller 10D. The output code information from the coding ROM 10F is converted by the P/S converter 10G into corresponding serial code data.

The control program for operating the controller 10D has the following steps.

Step 1: The subtracter 10A is controlled so as to calculate b1-a1. When $b1-a1 \geqq 4$, the program jumps to a step 4 to decide the coding mode to be the horizontal mode. When $-1 \leqq b1-a1 \leqq 3$, the coding mode is decided to be the vertical mode and the number a0 is set equal to the number a1. Then, the program returns to the start of the step 1. When $b1-a1 \leqq -2$, the resultant value b1−a1 is saved into the register 10C and the program advances to a step 2.

Step 2: The subtracter 10A is controlled so as to calculate b2−a1. When $b2-a1 < 0$, the coding mode is decided to be the pass mode and the number a0 is set equal to the number b2. Then, the program returns to the step 1. Widen $b2-a1 \geqq 0$, the program advances to a step 3.

Step 3: The contents of the register 10C, that is, the value b1−a1, is checked. When $-3 \leq b1-a1 \leq -2$, the coding mode is decided to be the vertical mode and the number a0 is set equal to the number a1. When $b1-a1 \leq -4$, the program advances to the step 4 to decide the coding mode to be the horizontal mode.

Step 4: The subtracter 10B is controlled so as to calculate a1−a0. Thus, a run length is calculated. Then, the program advances to a step 5.

Step 5: The subtracter 10B is controlled so as to calculate a2−a1. Thus, a run length is calculated. The coding mode is decided to be the horizontal mode. Then, the number a0 is set equal to the number a2 and the program returns to the step 1.

DESCRIPTION OF THE SECOND PREFERRED EMBODIMENT.

Figure 6:
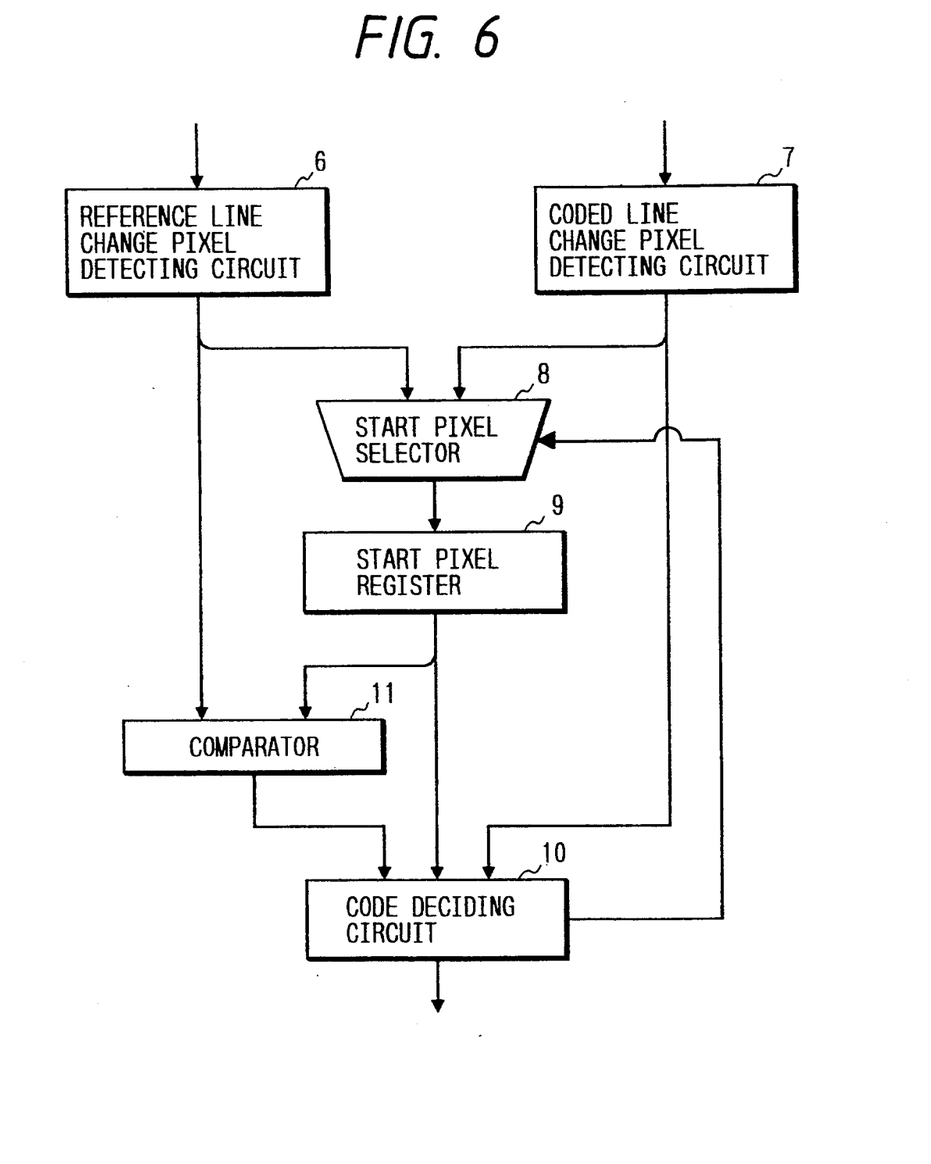
FIG. 6 is a block diagram of a coding apparatus according to a second embodiment of this invention.

FIG. 6 shows a second embodiment of this invention which is similar to the embodiment of FIGS. 1–5 except for the following design changes.

The embodiment of FIG. 6 includes a comparator 11 connected among a change pixel detecting circuit 6, a start pixel register 9, and a code deciding circuit 10.

When the change pixel detecting circuit 6 detects a change pixel on a reference line, the change pixel detecting circuit 6 generates reference-line change pixel information in response to the detected change pixel and outputs the reference-line change pixel information to the start pixel selector 8 and the comparator 11. As will be made clear later, the reference-line change pixel information is transmitted through the comparator 11 to the code deciding circuit 10 when given conditions are satisfied.

The start pixel register 9 feeds start pixel information to the comparator 11. The comparator 11 compares the reference-line change pixel information and the start pixel information. When reference-line change pixel exists leftward of the start pixel or when the reference-line change pixel exists at the position same as the position of the start pixel, the comparator 11 disables the reference-line change pixel information and inhibits the transmission of the reference-line change pixel information to the code deciding circuit 10. In addition, when the first reference-line change pixel which exists rightward of the start pixel is equal in color to the start pixel, the comparator 11 disables the reference-line change pixel information and inhibits the transmission of the reference-line change pixel information to the code deciding circuit 10. Under conditions other than the previously-mentioned conditions, the comparator 11 transmits the reference-line change pixel information to the code deciding circuit 10. In this way, the comparator 11 disables and removes unnecessary reference-line change pixel information, and selects only necessary reference-line change pixel information.

In temporally parallel with the above-mentioned processes by the change pixel detecting circuit 6 and the comparator 10, a change pixel detecting circuit 7 operates to detect change pixels on a coded line. When the change pixel detecting circuit 7 detects a change pixel on a coded line, the change pixel detecting circuit 7 generates coded-line change pixel information in response to the detected change pixel and outputs the coded-line change pixel information to a start pixel selector 8 and the code deciding circuit 10.

The code deciding circuit 10 determines a coding mode, and specifically selects one of the previously-mentioned three coding modes (the pass mode, the vertical mode, and the horizontal mode), in response to the reference-line change pixel information, the coded-line change pixel information, and the start pixel information. The code deciding circuit 10 executes the coding of the image signal in accordance with the determined coding mode. In addition, the code deciding circuit 10 generates a selector control signal in accordance with the determined coding mode, and outputs the generated control signal to the start pixel selector 8.

The start pixel selector 8 selects one of the output signals from the change pixel detecting circuits 6 and 7, that is, the reference-line change pixel information and the coded-line change pixel information, as start pixel information in response to the control signal. The change information in the selected change pixel information is used as color information of the start pixel information, and the pixel position information in the selected change pixel information is used as pixel position information of the start pixel information. The start pixel selector 8 outputs the start pixel information, and stores the start pixel information into the start pixel register 9. The stored start pixel information will be used in the determination of a subsequent coding mode.

The change pixel detecting circuits 6 and 7 execute processes of searching next change points in the reference line and the coded line simultaneously with or temporally parallel with the above-mentioned processes executed by the code deciding circuit 10, the start pixel selector 8, and the start pixel register 9. Thus, the detection of change pixels and the determination of a coding mode are executed simultaneously with or in temporally parallel with each other, so that a higher speed of the coding process is enabled.

Figure 7:
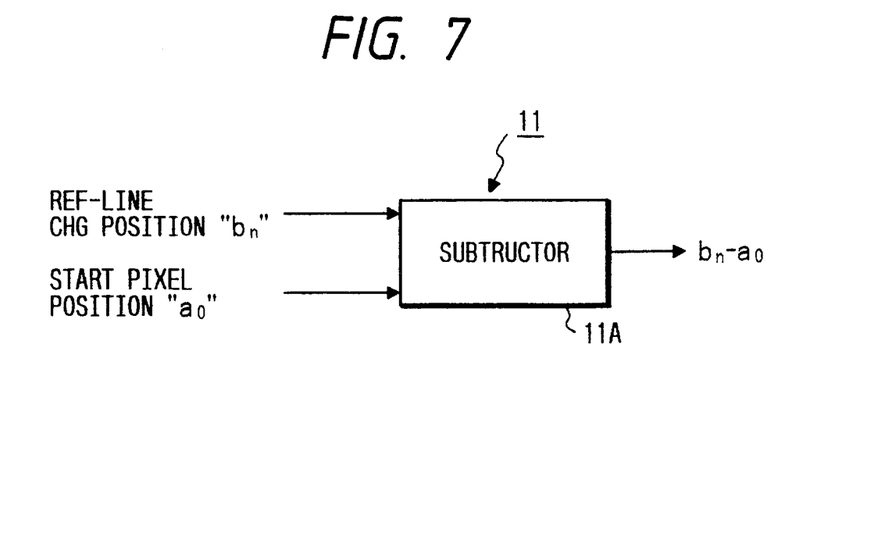
FIG. 7 is a block diagram of the comparator of FIG. 6.

As shown in FIG. 7, the comparator 11 includes a subtracter 11A which is controlled by a controller (see FIG. 5), for example, a processor, in accordance with a control program stored in a ROM (see FIG. 5).

The subtracter 11A receives a signal representing the position "bn" (bn=b1, or b2) of a change pixel on a reference line, and a signal representing the position "a0" of a start pixel. The subtracter 11A serves to calculate a difference between the position bn of a reference-line change pixel and the position a0 of a start pixel.

The control program has the following steps.

Step 1: The subtracter 11A is controlled so as to calculate bn−a0. When $bn-a0 \leq 0$, the present reference-line change pixel is decided to be unnecessary, and the program returns to the start of the step 1 to execute the processing with respect to a next reference-line change pixel. Thus, in this case, the reference-line change pixel information is disabled, and the transmission of the reference-line change pixel information to the code deciding circuit 10 is inhibited. When $bn-a0 > 0$, the program advances to a step 2.

Step 2: The change information of the reference-line change pixel is compared with the color information of the start pixel. When the change information of the reference-line change pixel is equal to the color information of the start pixel, the present reference-line change pixel is decided to be unnecessary and the program returns to the start of the step 1 to execute the processing with respect to a next reference-line change pixel. Thus, in this case, the reference-line change pixel information is disabled, and the transmission of the reference-line change pixel information to the code deciding circuit 10 is inhibited. When the change information of the reference-line change pixel is not equal to the color information of the start pixel, the present reference-line change pixel is decided to be necessary. Then, the reference-line change pixel information is transmitted to the code deciding circuit 10.

DESCRIPTION OF THE THIRD PREFERRED EMBODIMENT

Figure 8:
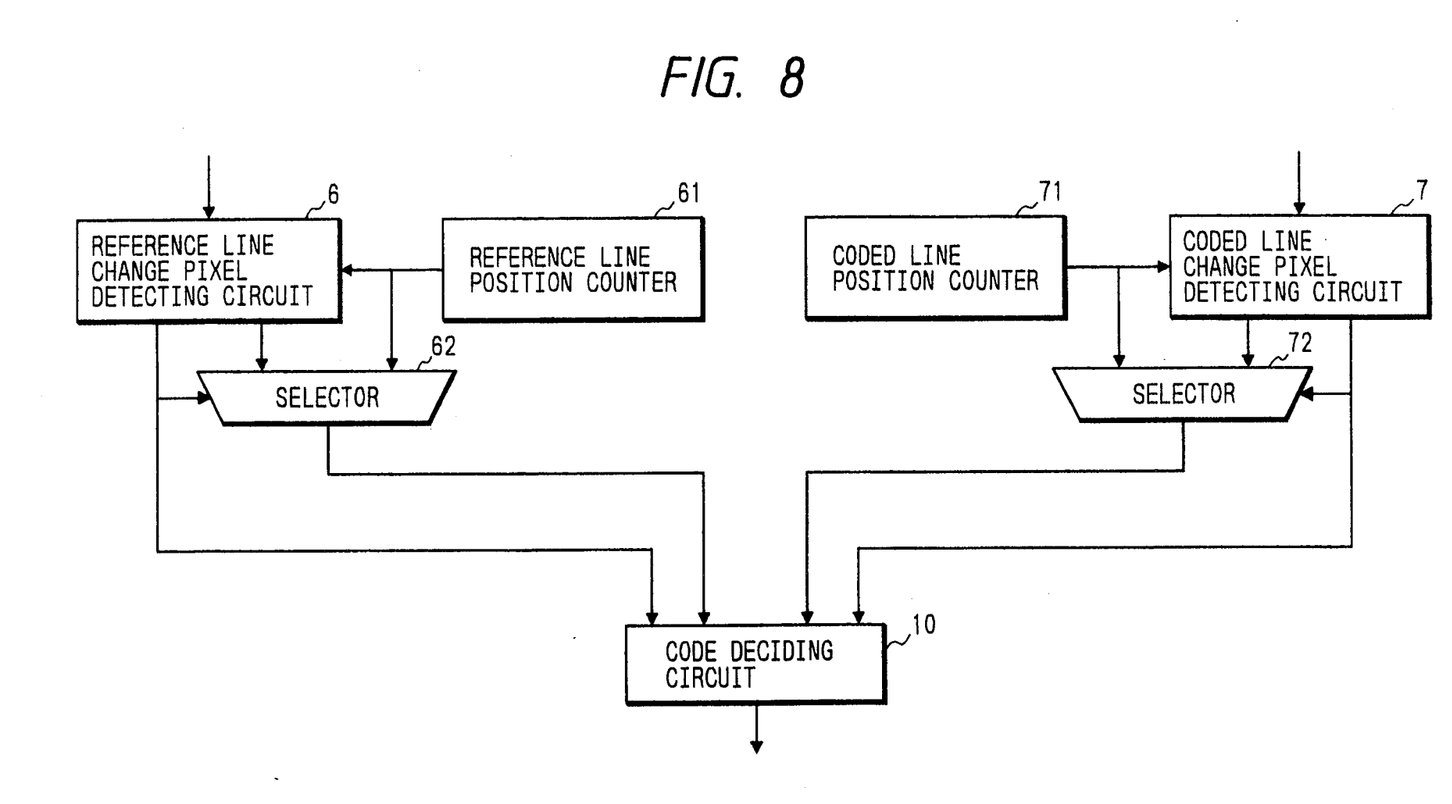
FIG. 8 is a block diagram of a coding apparatus according to a third embodiment of this invention.

FIG. 8 shows a third embodiment of this invention which is similar to the embodiment of FIGS. 1-5 except for design changes indicated later.

With reference to FIG. 8, a coding apparatus includes change pixel detecting circuits 6 and 7, counters 61 and 71, selectors 62 and 72, and a code deciding circuit 10. The change pixel detecting circuit 6 receives an image signal representing a reference line. The change pixel detecting circuit 6 serves to detect change pixels on the reference line. The counter 61 outputs a signal representing the pixel position information related to the detection by the change pixel detecting circuit 6. Specifically, the output signal from the counter 61 represents the position of the pixel which is currently scanned by the change pixel detecting circuit 6. The selector 62 selects one of the output signals from the change pixel detecting circuit 6 and the counter 61, and transmits the selected signal to the code deciding circuit 10. The change pixel detecting circuit 7 receives an image signal representing a coded line. The change pixel detecting circuit 7 serves to detect change pixels on the coded line. The counter 71 outputs a signal representing the pixel position information related to the detection by the change pixel detecting circuit 7. Specifically, the output signal from the counter 71 represents the position of the pixel which is currently scanned by the change pixel detecting circuit 7. The selector 72 selects one of the output signals from the change pixel detecting circuit 7 and the counter 71, and transmits the selected signal to the code deciding circuit 10. The code deciding circuit 10 also receives the output signals from the change pixel detecting circuits 6 and 7. The code deciding circuit 10 includes a subtracter which receives the output signals from the selectors 62 and 72 and which calculates a correlation between reference-line position information and coded-line position information. The subtracter within the code deciding circuit 10 corresponds to the subtracter 10A of FIG. 5. The code deciding circuit 10 determines the mode of MR coding in response to the output signals from the devices 6, 7, 62, and 72, and executes coding in dependence upon the determined coding mode.

Since the reference line immediately precedes the coded line, the reference-line in, age signal applied to the change pixel detecting circuit 6 has a 1-line time difference from the coded-line image signal applied to the change pixel detecting circuit 7. An input image signal is directly applied to one of the circuits 6 and 7, and is applied to the other via a suitable time adjustment, device (not shown) such as a 1-line delay circuit.

The coding apparatus of FIG. 8 operates as follows. The contents of the counter 61 are incremented one by one as the pixels on a reference line are scanned by the change pixel detecting circuit 6. Specifically, the counter 61 periodically executes a count-up process for each pixel. Thus, the output signal from the counter 61 represents the position of the pixel which is currently scanned by the change pixel detecting circuit 6. As described previously, the selector 62 selects one of the output signals from the change pixel detecting circuit 6 and the counter 61, and transmits the selected signal to the code deciding circuit 10. The selector 62 is controlled by the output signal from the change pixel detecting circuit 6. When the change pixel detecting circuit 6 detects a change pixel on a reference line, the change pixel detecting circuit 6 controls the selector 62 so that the output signal from the change pixel detecting circuit 6 will be selected. In other cases, the change pixel detecting circuit 6 controls the selector 62 so that the output signal from the counter 61 will be selected.

Similarly, the contents of the counter 71 are incremented one by one as the pixels on a coded line are scanned by the change pixel detecting circuit 7. Specifically, the counter 71 periodically executes a count-up process for each pixel. Thus, the output signal from the counter 71 represents the position of the pixel which is currently scanned by the change pixel detecting circuit 7. As described previously, the selector 72 selects one of the output signals from the change pixel detecting circuit 7 and the counter 71, and transmits the selected signal to the code deciding circuit 10. The selector 72 is controlled by the output signal from the change pixel detecting circuit 7. When the change pixel detecting circuit 7 detects a change pixel on a coded line, the change pixel detecting circuit 7 controls the selector 72 so that the output signal from the change pixel detecting circuit 7 will be selected. In other cases, the change pixel detecting circuit 7 controls the selector 72 so that the output signal from the counter 71 will be selected.

Figure 9:
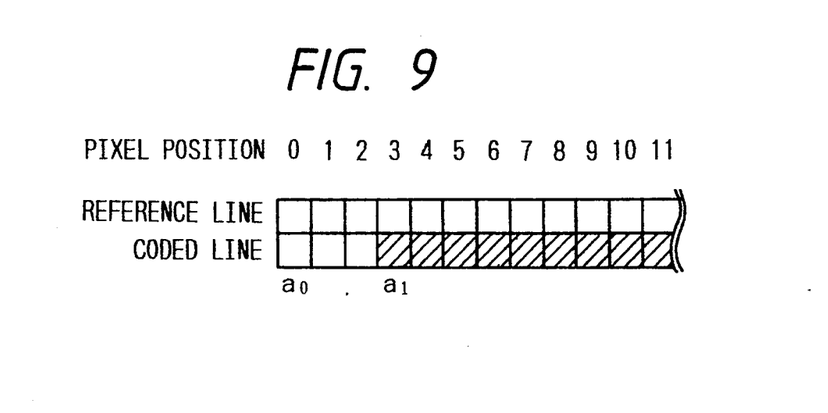
FIG. 9 is a diagram showing an example of conditions of pixels in a reference line and a coded line.

It is now assumed that a reference line and a coded line have conditions as shown in FIG. 9. In this case, a change pixel a1 on a coded line is detected by the change pixel detecting circuit 7, and the positional information "3" of the change pixel a1 is transmitted from the change pixel detecting circuit 7 to the code deciding circuit 10 via the selector 72. On the other hand, during the interval corresponding to a start portion of a reference line, since a change pixel is absent from the reference line as shown in FIG. 9, the selector 62 continues to be controlled by the change pixel detecting circuit 6 so that the output signal from the counter 61 remains selected. The code deciding circuit 10 monitors the output signal from the counter 61. When the number counted by the counter 61 reaches "7", the code deciding circuit 10 recognizes that change pixels b1 and b2 exist at positions later than the position "6", and that the conditions "a1≦b2" and the conditions "|a1−b1|>3" are satisfied. Therefore, the code deciding circuit 10 decides a coding mode to be a horizontal mode.

Figure 10:
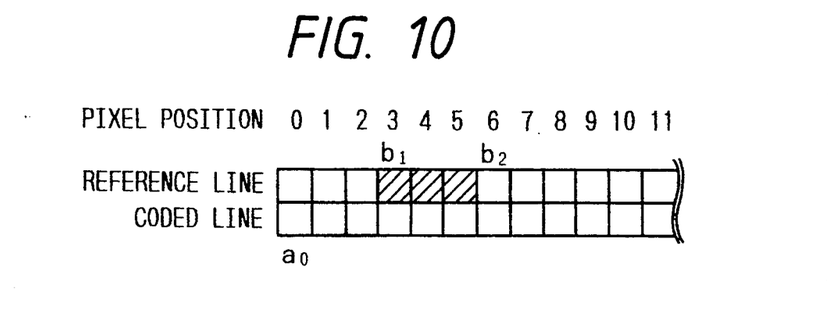
FIG. 10 is a diagram showing another example of conditions of pixels in a reference line and a coded line.

It is now assumed that a reference line and a coded line have conditions as shown in FIG. 10. In this case, a change pixel b1 on a reference line is detected by the change pixel detecting circuit 6, and the positional information "3" of the change pixel b1 is transmitted from the change pixel detecting circuit 6 to the code deciding circuit 10 via the selector 62. Then, a change pixel b2 on the reference line is detected by the change pixel detecting circuit 6, and the positional information "6" of the change pixel b2 is transmitted from the change pixel detecting circuit 6 to the code deciding circuit 10 via the selector 62. On the other hand, during the interval corresponding to a start portion of a coded line, since a change pixel is absent from the coded line as shown in FIG. 9, the selector 72 continues to be controlled by the change pixel detecting circuit 7 so that the output signal from the counter 71 remains selected. The code deciding circuit 10 monitors the output signal from the counter 71. When the number counted by the counter 71 reaches "7", the code deciding circuit 10 recognizes that a change pixel a 1 exists at a position later than the position "6", and that the conditions "a1>b2" are satisfied. Therefore, the code deciding circuit 10 decides the coding mode to be a pass mode.

What is claimed is:

1. A coding apparatus comprising:

first detecting means for sequentially detecting change pixels in a currently-coded line independent of a start pixel, and deriving information of the detected change pixels in the currently-coded line;

second detecting means for sequentially detecting change pixels in a reference line independent of the start pixel, and deriving information of the detected change pixels in the reference line, the reference line immediately preceding the currently-coded line;

selecting means for selecting one of the information derived by the first detecting means and the information derived by the second detecting means;

generating means for generating information of the start pixel from the information selected by the selecting means;

comparing means for comparing the information generated by the generating means and the information derived by the second detecting means, selectively disabling and enabling the information derived by the second detecting means, and outputting only the enabled information derived by the second detecting means; and deciding means for deciding a mode of MR coding in accordance with the information derived by the first detecting means, the information outputted from the comparing means, and the information generated by the generating means.

2. A coding apparatus comprising:

first detecting means for sequentially scanning pixels in a currently-coded line, sequentially detecting change pixels in the currently-coded line independent of a start pixel, and deriving information of the detected change pixels in the currently-coded line;

first generating means for generating information representing a position of a pixel currently scanned by the first detecting means;

second detecting means for sequentially scanning pixels in a reference line, sequentially detecting change pixels in the reference line independent of the start pixel, and deriving information of the detected change pixels In the reference line, the reference line immediately preceding the currently-coded line;

second generating means for generating information representing a position of a pixel currently scanned by the second detecting means; and deciding means for deciding a mode of MR coding in accordance with the information derived by the first detecting means, the information generated by the first generating means, the information derived by the second detecting means, and the information generated by the second generating means.

3. A coding apparatus comprising:

first detecting means for sequentially scanning pixels in a currently-coded line, sequentially detecting change pixels in the currently-coded line independent of a start pixel, and deriving information of the detected change pixels in the currently-coded line;

first generating meters for generating information representing a position of a pixel currently scanned by the first detecting means;

first selecting means for selecting one of the information derived by the first detecting means and the information generated by the first generating means;

second detecting means for sequentially scanning pixels in a reference line, sequentially detecting change pixels in the reference line independent of the start pixel, and deriving information of the detected change pixels in the reference line, the reference line immediately preceding the currently-coded line;

second generating means for generating information representing a position of a pixel currently scanned by the second detecting means;

second selecting means for selecting one of the information derived by the second detecting means and the information generated by the second generating means; and deciding means for deciding a mode of MR coding in accordance with the information selected by the first selecting means, and the information selected by the second selecting means.

* * * * *